(12) United States Patent
Pillai et al.

(10) Patent No.: US 9,900,268 B2
(45) Date of Patent: Feb. 20, 2018

(54) SYSTEM, METHOD AND APPARATUS FOR MULTI-LANE AUTO-NEGOTIATION OVER REDUCED LANE MEDIA

(71) Applicant: Avago Technologies General IP (Singapore) Pte. Ltd., Singapore (SG)

(72) Inventors: Velu Chellam Pillai, Austin, TX (US); Vivek Pundlik Telang, Austin, TX (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 623 days.

(21) Appl. No.: 14/222,608

(22) Filed: Mar. 22, 2014

(65) Prior Publication Data
US 2015/0229588 A1    Aug. 13, 2015

Related U.S. Application Data

(60) Provisional application No. 61/939,398, filed on Feb. 13, 2014.

(51) Int. Cl.
*H04L 12/935* (2013.01)
*H04L 12/40* (2006.01)
*H04L 5/14* (2006.01)

(52) U.S. Cl.
CPC ...... *H04L 49/3054* (2013.01); *H04L 12/4013* (2013.01); *H04L 5/1446* (2013.01)

(58) Field of Classification Search
CPC ..... H04L 5/1446; H04L 5/14; H04L 49/3054; H04L 49/352; H04L 49/25; H04L 49/351; H04L 49/00; H04L 45/16; H04L 45/44; H04L 27/00; H04L 1/0041; H04L 1/0061;
(Continued)

(56) References Cited

U.S. PATENT DOCUMENTS 6,349,331 B1 * 2/2002 Andra ............... H04L 12/40032
709/220
6,873,630 B1 * 3/2005 Muller ................... H04L 29/06
370/356
(Continued)

FOREIGN PATENT DOCUMENTS

CN       1969569        5/2007
CN       103401728 A    11/2013
(Continued)

OTHER PUBLICATIONS

Partial European Search Report for European Patent Application No. 15000237.6 dated Sep. 7, 2015.
(Continued)

*Primary Examiner* — Andrew Chriss
*Assistant Examiner* — Rasha Fayed
(74) *Attorney, Agent, or Firm* — Foley & Lardner LLP

(57) ABSTRACT

A system, method and apparatus for multi-lane auto-negotiation over reduced-lane media. Auto-negotiation over an M-lane communication interface can be coordinated with the auto-negotiation over an N-lane communication interface, wherein M>N. A recursive-type auto-negotiation process would begin with the M-lane communication interface and be prevented from completing until the auto-negotiation process over the N-lane communication interface completes.

20 Claims, 4 Drawing Sheets

(58) Field of Classification Search
CPC ....... H04L 1/0072; H04L 29/06; G06F 13/40;
G06F 13/36; G06F 13/00
USPC .................. 370/437, 419; 710/307, 29, 314;
375/295
See application file for complete search history.

(56) References Cited

U.S. PATENT DOCUMENTS

| | | | | |
|---|---|---|---|---|
| 7,720,135 | B2* | 5/2010 | Booth | H04L 12/40136 370/296 |
| 8,886,856 | B1* | 11/2014 | Mendel | G06F 13/4265 710/20 |
| 9,172,602 | B1* | 10/2015 | Dropps | H04L 41/0803 |
| 2002/0027888 | A1* | 3/2002 | Creigh | H04B 3/32 370/282 |
| 2003/0165142 | A1* | 9/2003 | Mills | H04L 12/12 370/395.62 |
| 2005/0129052 | A1* | 6/2005 | Hurwitz | H04L 12/44 370/445 |
| 2007/0086450 | A1* | 4/2007 | Baumer | H04L 41/00 370/389 |
| 2008/0089236 | A1 | 4/2008 | Kotrla et al. | |
| 2008/0138075 | A1* | 6/2008 | Gustlin | H04L 47/10 398/115 |
| 2009/0109998 | A1* | 4/2009 | Vinayagam | H04L 41/0886 370/465 |
| 2010/0077097 | A1* | 3/2010 | Brown | H04L 29/04 709/233 |
| 2010/0128695 | A1 | 5/2010 | Nagaraja | |
| 2011/0019689 | A1* | 1/2011 | Diab | H04L 49/3054 370/462 |
| 2012/0076139 | A1* | 3/2012 | Tanizawa | H04L 69/24 370/389 |
| 2014/0003283 | A1* | 1/2014 | Koenen | H04L 41/0896 370/254 |

FOREIGN PATENT DOCUMENTS

EP 2688243 1/2014
WO WO-2013/078799 6/2013

OTHER PUBLICATIONS

Communication pursuant to Article 94(3) EPC for European Patent Application No. 15000237.6 dated Apr. 25, 2016.
Chinese Office Action for Chinese Application No. 201510050537.3, dated Aug. 3, 2017, 6 pages.

* cited by examiner

SYSTEM, METHOD AND APPARATUS FOR MULTI-LANE AUTO-NEGOTIATION OVER REDUCED LANE MEDIA

This application claims the benefit of and priority to provisional application No. 61/939,398, filed Feb. 13, 2014, which is incorporated herein by reference in its entirety.

BACKGROUND

Field

The present disclosure relates generally to digital communications, and includes a disclosure of an example system, method and apparatus for multi-lane auto-negotiation over reduced lane media.

Introduction

Management of an IT infrastructure is a key factor in the operation of any enterprise. For example, data centers have elevated in importance as their resilient operation is crucial to the delivery of services by the enterprise. Various initiatives such as energy efficiency, security and virtualization have become the focus of many efforts to improve the ability of the IT infrastructure to meet their performance objectives.

The IT infrastructure will continue to evolve as next-generation technologies are adopted for use in the enterprise environment. For example, higher bandwidth data links will continue to be introduced into the IT infrastructure to cope with the increased data needs of applications being supported by the enterprise.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Figure 1:
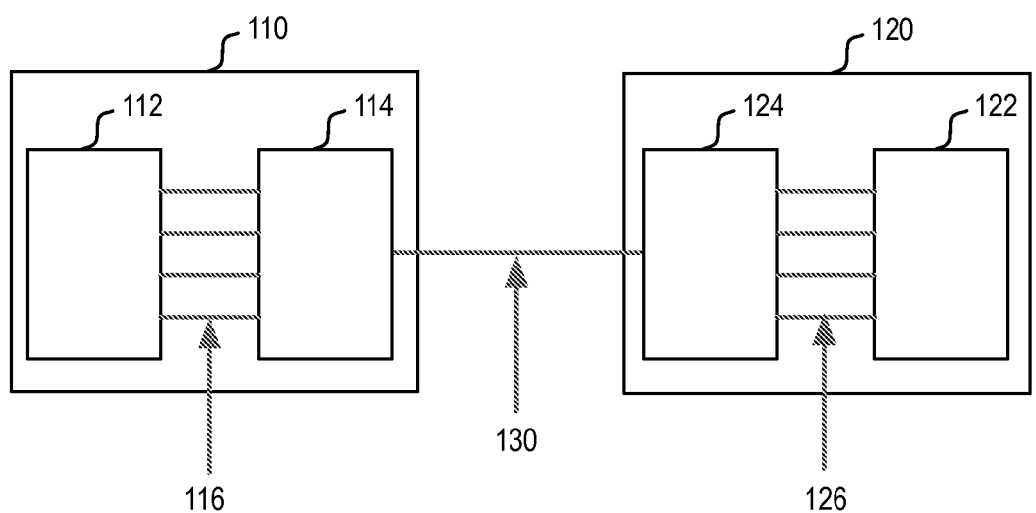
FIG. 1 illustrates an example of a system that reduces an M-lane transmission to an N-lane transmission.

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

The introduction of higher-bandwidth links has benefited from improvements in signal processing technology. Such improvements have enabled higher-rate signaling to be used over a reduced number of lanes. For example, 10 Gbps transmission can be initially implemented using four lanes, wherein each of the four lanes supports operation at 2.5 Gbps. Based on improvements in signal processing technology, later implementations of the 10 Gbps transmission can be based on a single lane that supports operation at 10 Gbps.

Auto-negotiation protocols are typically defined to support the initial implementation of a transmission link using multi-lanes of transmission. Such a defined auto-negotiation protocol can hinder the later implementation of an auto-negotiation protocol for subsequent reduced-lane implementations of a transmission link at a given link transmission speed.

In the present disclosure, a mechanism for implementing multi-lane auto-negotiation over reduced lane media is provided. While specific examples are provided below, such examples are not intended to be limiting.

In one embodiment, a method is provided, which includes receiving, by a physical layer device as part of a first auto-negotiation process, first auto-negotiation capability information from an M-lane communication device over an M-lane communication interface. Next, second auto-negotiation capability information can be transmitted, by the physical layer device over an N-lane communication interface as part of a second auto-negotiation process, wherein the second auto-negotiation capability information is based on the first auto-negotiation capability information. In one example, the first auto-negotiation capability information is used to learn the capabilities of the link partner on the system side. This information can then be applied on the line side as the second auto-negotiation capability information. The N-lane communication interface can be a reduced-lane implementation such that M>N. After completion of the second auto-negotiation process, the physical layer device can then transmit third auto-negotiation capability information to the M-lane communication device over the M-lane communication interface.

In various embodiments, the N-lane communication interface can be a single-lane interface, or can be a multi-lane interface. In a further embodiment, the physical layer device can squelch transmission by the physical layer device to the M-lane communication device until the completion of the second auto-negotiation process. In another embodiment, the physical layer device can restart the first auto-negotiation process after the completion of the second auto-negotiation process. In yet another embodiment, the physical layer device can send null pages or advertise zero capabilities to the M-lane communication device.

In another embodiment, a device is provided, which includes an M-lane communication interface that is configured for communication with an M-lane communication device, and an N-lane communication interface that is configured for communication with an N-lane communication device, wherein M>N. The device also includes a controller that is configured to control a first auto-negotiation process with the M-lane communication device over the M-lane communication interface and a second auto-negotiation process with the N-lane communication device over the N-lane communication interface. The controller can be further configured to transmit auto-negotiation information to the M-lane communication device over the M-lane communication interface, wherein the transmitted auto-negotiation information includes information based on a completion of the second auto-negotiation process with the N-lane communication device over the N-lane communication interface. In various embodiments, the controller can be implemented as electronic hardware, computer software, or a combination of both.

Many Ethernet applications use multiple lanes for auto-negotiation. Various examples such as 40GBASE-KR4, 40GBASE-CR4, 100GBASE-KR4, 100GBASE-KP4, and 100GBASE-CR4 exist. As noted, improvements in signal processing technology can enable higher-rate transmission links to be used over a reduced number of lanes. For example, the 40GBASE-CR4 protocol can be supported over a single-pair media instead of the four pairs specified by the standard.

FIG. 1 illustrates a generic system that can reduce an M-lane transmission system to an N-lane transmission system, and which can benefit from the principles disclosed herein. For illustration purposes, the example of a reduction of a four-pair transmission system to a single-pair transmission system is provided. As illustrated, two network devices 110, 120 operating as link partners are illustrated. Network device 110 includes device 112 (e.g., switch, controller, ASIC) and device 114 (e.g., external physical layer device (PHY), repeater, re-timer), while network device 120 includes counterpart devices 122 and 124. Device 112 is configured to communicate with device 114 over M-lane communication interface 116 (e.g., M=4). Similarly, device 122 is configured to communicate with device 124 over M-lane communication interface 126 (e.g., M=4).

In supporting higher-rate signaling, devices 110 and 120 can include devices 114 and 124, respectively, which can be configured to reduce the number of lanes of transmission between network devices 110 and 120. In facilitating this reduced-lane transmission, device 114 in network device 110 is configured to communicate with device 112 in network device 110 over M-lane communication interface 116, and to communicate with device 124 in network device 120 over N-lane communication interface 130. As a counterpart, device 124 in network device 120 is configured to communicate with device 122 in network device 120 over M-lane communication interface 126, and to communicate with device 114 in network device 110 over N-lane communication interface 130.

As would be appreciated, the concepts illustrated in FIG. 1 are not intended to be limiting to this disclosure. The particular illustration provides an example instance of a reduction of M-lane transmission to N-lane transmission, wherein M>N. No loss of generality is implied by the example illustration. Various ratios can be defined beyond the 4:1 illustration. For example, reduced-lane implementations can be defined having ratios of 10:4, 10:1, 8:4, 4:2, 2:1, or any other ratio where M>N.

Moreover, it should be noted that the illustration of FIG. 1 is not intended to be limiting with respect to the physical implementation of devices 112, 122, relative to devices 114, 124. While FIG. 1 illustrates devices 112 and 114 as being contained in a single network device 110 and devices 122 and 124 as being contained in a single network device 120, various other implementation are possible. For example, devices 112 and 114 or devices 122 and 124 can be implemented in different boxes, racks, or rooms relative to each other. As such, the concepts presented in this disclosure are intended to cover the relative operation between different communication interfaces rather than the specific relationship of those communication interfaces relative to a defined network device.

It is recognized that the IEEE 802.3 auto-negotiation protocol is defined over multiple lanes, and can present a bottleneck in the definition of reduced-lane applications. As will be described in greater detail below, a reduced-lane auto-negotiation process can be performed in a recursive-type manner to complement a multi-lane auto-negotiation process. One of the benefits of such a framework is that the reuse of existing auto-negotiation protocols is provided in preventing obsolescence of prior technology.

Figure 2:
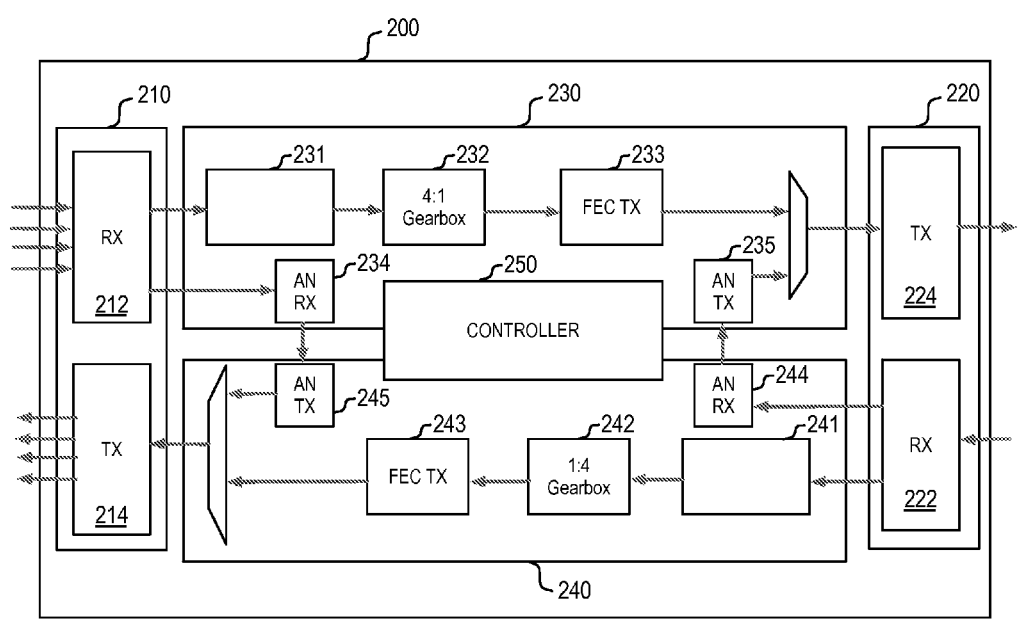
FIG. 2 illustrates an example embodiment of a device that controls an M-lane auto-negotiation and an N-lane auto-negotiation.

FIG. 2 illustrates an example embodiment of a device that controls an M-lane auto-negotiation and an N-lane auto-negotiation. In one example, device 200 can represent an example implementation of device 114, 124 described above with reference to FIG. 1. As illustrated, device 200 includes transceivers 210, 220, multiplex data path 230, de-multiplex data path 240, and controller 250.

Transceiver 210 includes receiver (RX) 212 and transmitter (TX) 214, which enable communication by device 200 with an M-lane communication device. Transceiver 220, on the other hand, includes RX 222 and TX 224, which enable communication by device 200 with an N-lane communication device. As would be appreciated, transceivers 210 and 220 would be implementation dependent and can vary in its interface with various media (e.g., optical, backplane, twisted pair, copper, etc.) and signaling schemes (e.g., NRZ, PAM-N, etc.).

Multiplex data path 230 is generally designed to multiplex data received at a lower rate over the M-lane communication interface for communication at a higher rate over the N-lane communication interface. The implementation of multiplex data path 230 can vary depending on the particular M-lane communication interface and N-lane communication interface that are used. In the example illustration of FIG. 2, multiplex data path 230 includes element 231, which can be configured to support functions such as a phase FIFO, deskew, forward error correction (FEC) RX, rate converter, physical coding sublayer (PCS), or any other function prior to the provision of data to M:N gearbox (e.g., 4:1) 232. In general, M:N gearbox is configured to generate one or more higher-rate data streams that are provided to FEC TX 233. The output of FEC TX 233 is then provided to TX 224 for transmission over the N-lane communication interface.

Similarly, de-multiplex data path 240 is generally designed to de-multiplex data received at a higher rate over the N-lane communication interface for communication at a lower rate over the M-lane communication interface. The implementation of de-multiplex data path 240 can vary depending on the particular M-lane communication interface and N-lane communication interface that are used. In the example illustration of FIG. 2, de-multiplex data path 240 includes element 241, which can be configured to support functions such as a phase FIFO, FEC RX, rate converter, PCS, or any other function prior to the provision of data to N:M gearbox (e.g., 1:4) 242. In general, N:M gearbox is configured to generate a plurality of lower-rate data streams that are provided to FEC TX 243. The output of FEC TX 243 is then provided to TX 214 for transmission over the M-lane communication interface.

As illustrated, multiplex data path 230 and de-multiplex data path 240 also include auto-negotiation elements for implementation of the auto-negotiation protocol over the M-lane communication interface and the N-lane communication interface. In particular, the auto-negotiation protocol over the M-lane communication interface is enabled by AN RX 234 in multiplex data path 230 and AN TX 245 in de-multiplex data path 240, while the auto-negotiation protocol over the N-lane communication interface is enabled by AN RX 244 in de-multiplex data path 240 and AN TX 235 in multiplex data path 230. Control of AN RX 234, AN TX 235, AN RX 244, AN TX 245, as well as the other elements in multiplex data path 230 and de-multiplex data path 240 can be performed by controller 250. In various embodiments, controller 250 can be implemented as electronic hardware, computer software, or a combination of both.

Figure 3:
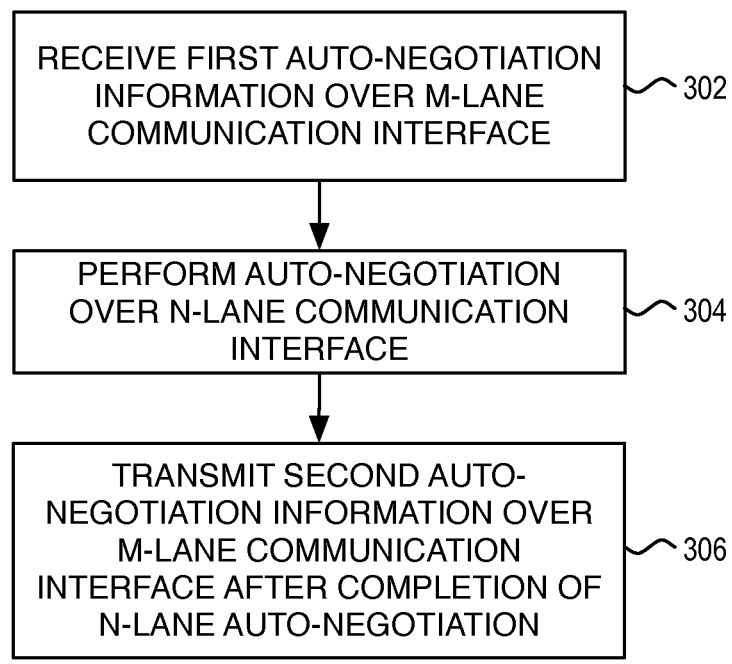
FIG. 3 illustrates an example flowchart of a process.

The functionality of the elements AN RX 234, AN TX 235, AN RX 244, and AN TX 245 in the context of a multi-lane auto-negotiation over a reduced-lane media is now described with reference to the flowchart of FIG. 3. As illustrated, the process can begin at step 302, where after a power-on reset of the PHY, first auto-negotiation information is received over the system-side M-lane interface. With reference to FIG. 2, the first auto-negotiation information is received by RX 212 and passed on to AN RX 234 in multiplex data path 230. The first-auto-negotiation information can include capability information of the system-side PHY. In one embodiment, the operation of AN TX 235 on the line-side is squelched until the system-side auto-negotiation information is received by AN RX 234.

After the capability information on the system side is identified based on the receipt of the auto-negotiation base page and next pages, the auto-negotiation over the N-lane communication interface on the line side can commence at step 304 using the received information. For example the system-side speeds can be inserted into the appropriate line-side base page and next pages.

In one embodiment, the auto-negotiation process on the system side is halted or otherwise prevented from completing prior to the completion of the auto-negotiation over the N-lane communication interface on the line side. In one example, AN TX 245 is squelched or otherwise prevented from transmitting auto-negotiation information over the M-lane communication interface. In another example, controller 250 can force the auto-negotiation process over the M-lane communication interface to restart. In yet another example, AN TX 245 can be configured to transmit null pages or advertise zero capabilities over the M-lane communication interface.

The auto-negotiation process on the line-side is enabled through the transmission of auto-negotiation information by AN TX 235 over the N-lane communication interface on the line side, and the corresponding receipt of auto-negotiation information by AN RX 244 over the N-lane communication interface. Once the auto-negotiation process over the line-side is completed, the line-side link can be brought up, wherein the link partners can train the transmit de-emphasis. In one embodiment, the line-side link can be kept up by having the PCS transmit idle signals until the system-side link is up and traffic starts flowing over the M-lane communication interface.

Based on the completion of the auto-negotiation process over the line side, the process then continues to step 306 where auto-negotiation information is transmitted over the M-lane communication interface. The auto-negotiation information (e.g., speed information) transmitted over the M-lane communication interface can be based on the completion of the auto-negotiation process on the line side. This information can be transmitted using AN TX 245. Once the system-side link is up and the traffic starts flowing, the line side can stop transmitting idles and start passing the traffic at the appropriate code boundaries.

As has been described, a recursive-type auto-negotiation process can be performed across multiple communication interfaces. This recursive-type auto-negotiation process is independent of the signaling (e.g., NRZ, PAM-N, etc.) that is used over the multiple communication interfaces.

Figure 4:
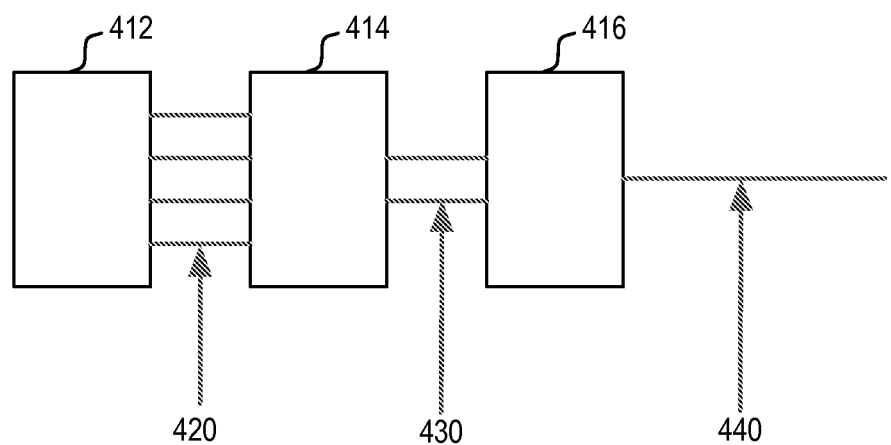
FIG. 4 illustrates an example of a device that can enable multiple nested auto-negotiations in a reduced-lane transmission system.

As the auto-negotiation process described above has a recursive property, the process described herein can be applied to an arbitrary number of levels. FIG. 4 illustrates an example of a device that can enable multiple nested auto-negotiations in a reduced-lane transmission system. For illustration purposes, only a single side of the system is shown. As illustrated one side of the system can include devices 412, 414 and 416, which or may not be implemented in a single device.

Devices 412 and 414 are configured to communicate over communication interface 420, devices 414 and 416 are configured to communicate over communication interface 430, and device 416 is configured to communicate with another device on the second line side over communication interface 440. In this simple illustration, communication interface 420 is a 4-lane communication interface, communication interface 430 is a 2-lane communication interface, and communication interface 440 is a single-lane communication interface.

In operation, the auto-negotiation process will be performed recursively with nested loops such that the auto-negotiation between device 416 and its partner would complete prior to the auto-negotiation between device 414 and its partner. Similarly, the auto-negotiation between device 414 and its partner would complete prior to the auto-negotiation between device 412 and its partner. As would be appreciated, an arbitrary number of levels can be implemented in a system.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
    receiving, by a physical layer device as part of a first auto-negotiation process, first auto-negotiation capability information from an M-lane communication device over an M-lane communication interface;
    transmitting, by the physical layer device as part of a second auto-negotiation process, second auto-negotiation capability information over an N-lane communication interface to an N-lane communication device, the second auto-negotiation capability information transmitted over the N-lane communication interface being based on the first auto-negotiation capability information received over the M-lane communication interface, wherein M>N;

completing, by the physical layer device, the second auto-negotiation process with the N-lane communication device; and after the completion of the second auto-negotiation process between the physical layer device and the N-lane communication device over the N-lane communication interface, transmitting, by the physical layer device, third auto-negotiation capability information to the M-lane communication device over the M-lane communication interface.

2. The method of claim 1, wherein N is equal to one.

3. The method of claim 1, wherein N is not equal to one.

4. The method of claim 1, further comprising squelching transmission by the physical layer device to the M-lane communication device until the completion of the second auto-negotiation process.

5. The method of claim 1, further comprising restarting the first auto-negotiation process responsive to the second auto-negotiation process being incomplete.

6. The method of claim 1, further comprising transmitting a null page or advertising zero capabilities to the M-lane communication device, responsive to the second auto-negotiation process with the N-lane communication device being incomplete.

7. A device, comprising:
an M-lane communication interface that is configured for communication with an M-lane communication device;
an N-lane communication interface that is configured for communication with an N-lane communication device, wherein M>N; and
a controller that is configured to control a first auto-negotiation process with the M-lane communication device over the M-lane communication interface and a second auto-negotiation process with the N-lane communication device over the N-lane communication interface, wherein the controller is further configured to transmit auto-negotiation information to the M-lane communication device over the M-lane communication interface, the transmitted auto-negotiation information over the M-lane communication interface including information based on a completion of the second auto-negotiation process with the N-lane communication device over the N-lane communication interface.

8. The device of claim 7, wherein the controller is configured to prevent a completion of the first auto-negotiation process until after the second auto-negotiation process completes.

9. The device of claim 7, wherein the controller is configured to restart the first auto-negotiation process responsive to the second auto-negotiation process being incomplete.

10. The device of claim 7, wherein the controller is configured to transmit a null page or advertising zero capabilities to the M-lane communication device, responsive to the second auto-negotiation process with the N-lane communication device being incomplete.

11. The device of claim 7, wherein the N-lane interface is a 40G interface.

12. The device of claim 7, wherein the N-lane interface is a 100G interface.

13. The device of claim 7, wherein the N-lane interface is a 400G interface.

14. A network device, comprising:
a first communication device that is configured for communication with an M-lane communication interface;
a second communication device that is configured for communication with the first communication device over the M-lane communication interface, and for communication with a third communication device over an N-lane communication interface, wherein M>N; and
a controller that is configured to control a first auto-negotiation process between the first communication device and the second communication device over the M-lane interface and a second auto-negotiation process between the second communication device and the third communication device over the N-lane communication interface, wherein the controller is further configured to control the transmission of auto-negotiation information from the second communication device to the first communication device over the M-lane communication interface, the transmitted auto-negotiation information over the M-lane communication interface including information based on a completion of the second auto-negotiation process between the second communication device and the third communication device over the N-lane communication interface.

15. The network device of claim 14, wherein N is equal to one.

16. The network device of claim 14, wherein N is not equal to one.

17. The network device of claim 14, wherein the controller is configured to prevent a completion of the first auto-negotiation process until after the second auto-negotiation process completes.

18. The network device of claim 14, wherein the controller is configured to restart the first auto-negotiation process responsive to the second auto-negotiation process being incomplete.

19. The network device of claim 14, wherein the third communication device is in the network device.

20. The network device of claim 19, wherein the third communication device has a P-lane communication interface for communication with a fourth communication device, wherein N>P.

* * * * *